UNITED STATES PATENT OFFICE.

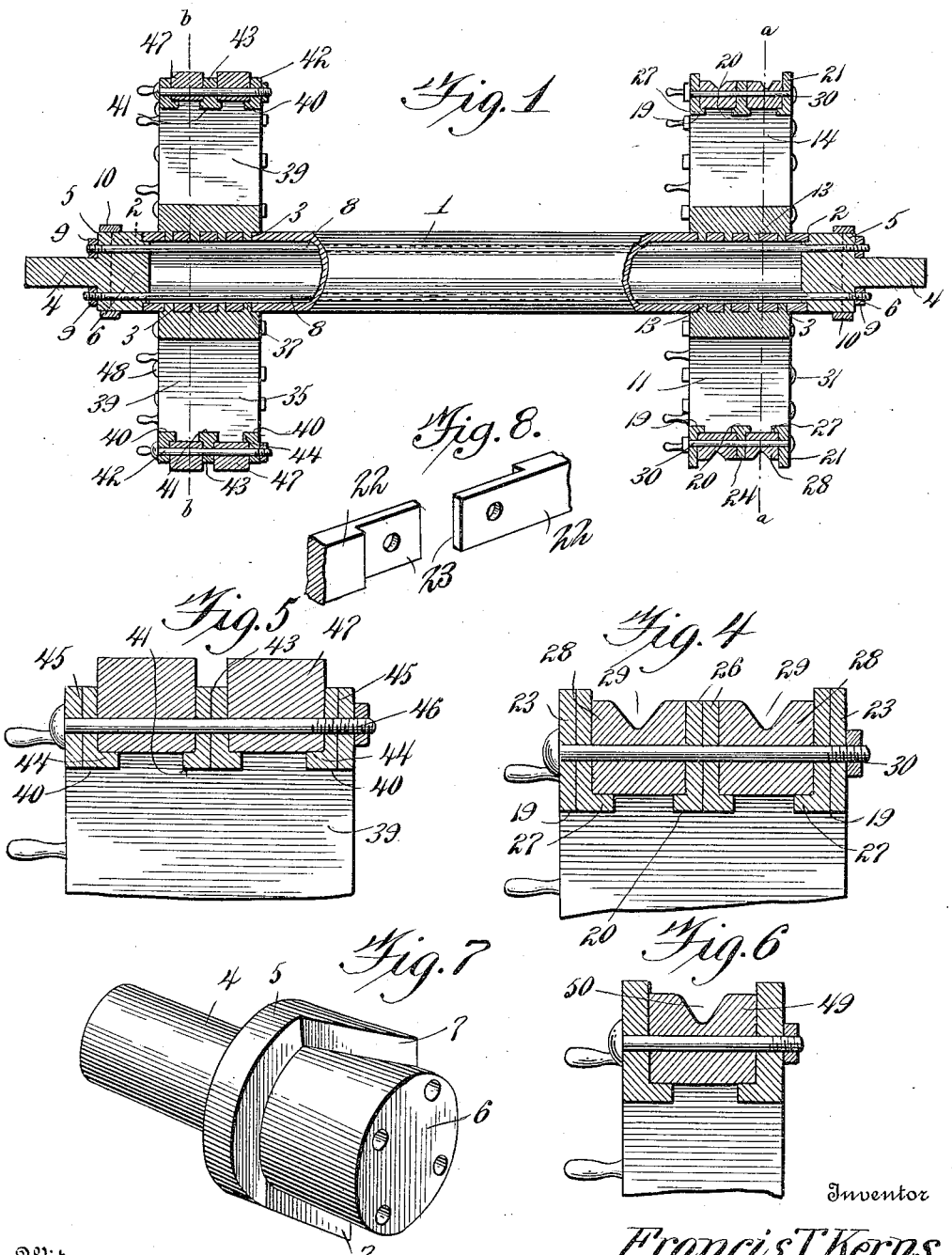

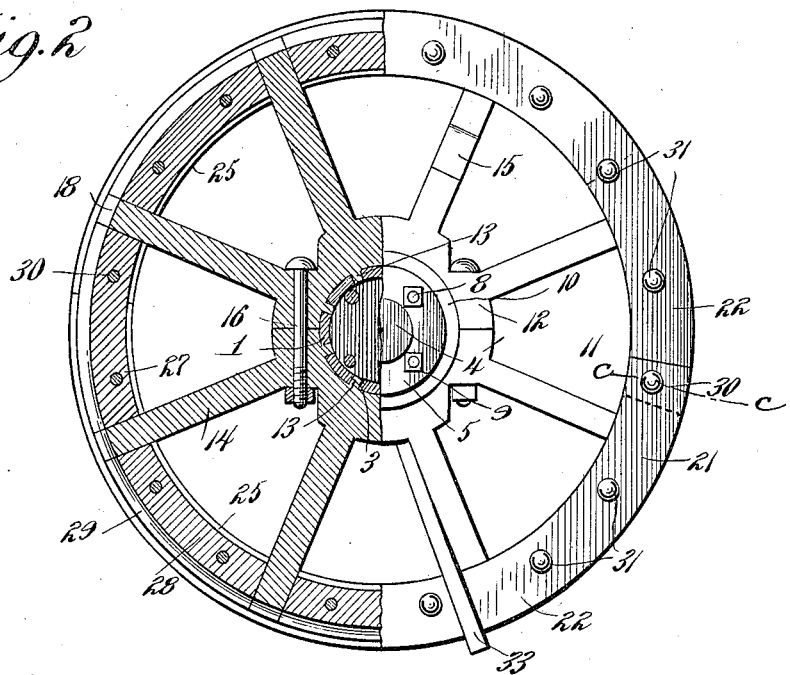
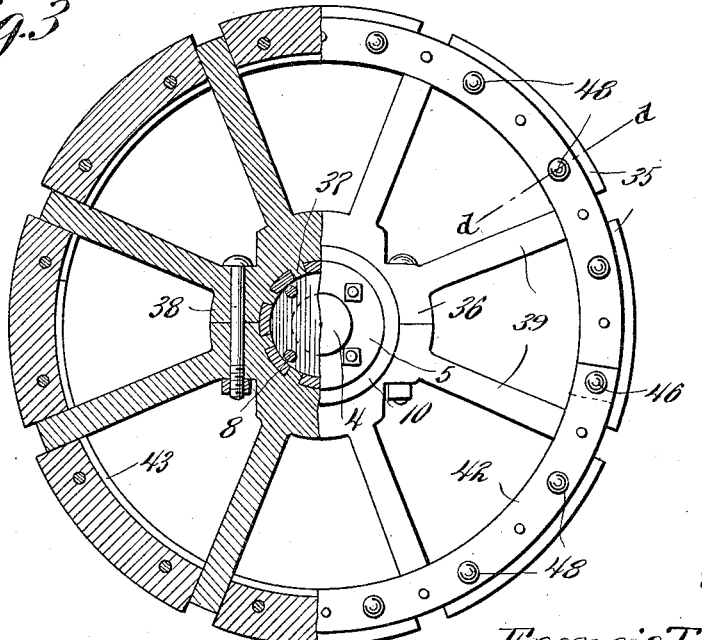

FRANCIS T. KERNS, OF BEHLER, WEST VIRGINIA.

WHEEL.

1,060,460.  Specification of Letters Patent.  Patented Apr. 29, 1913.

Application filed March 2, 1912. Serial No. 681,105.

*To all whom it may concern:*

Be it known that I, FRANCIS T. KERNS, a citizen of the United States, residing at Behler, in the county of Monongalia and State of West Virginia, have invented new and useful Improvements in Wheels, of which the following is a specification.

This invention relates to improvements in bull wheels or winding drums such as are employed in connection with well drilling rigs for drilling oil and other like wells, the object of the invention being to provide an improved bull wheel and shaft which is exceedingly strong, and durable, which is made of iron or steel or other suitable metal and which is constructed of separable parts which admit of the bull wheel being assembled and disassembled readily so as to greatly facilitate repairs and correspondingly reduce the expense of maintaining the bull wheel.

One object of the invention is to effect improvements in the construction of the shaft and gudgeons whereby the latter are adapted to be readily and detachably secured to the end of the shaft.

Another object of the invention is to effect improvements in the construction of the tug and brake wheels.

Still another object is to provide the tug and brake wheels with detachable cants which are made of wood and may be readily removed and renewed when worn.

The prime object of my invention is to provide an improved bull wheel which is capable of withstanding immense strains, long, continued usage and is not likely to get out of order.

With the foregoing and other objects in view, my invention consists in the construction, combination and arrangement of devices, hereinafter described and claimed.

In the accompanying drawings:—Figure 1 is a vertical longitudinal central sectional view of a bull wheel, constructed in accordance with my invention. Fig. 2 is partly an end elevation and partly a sectional view of the same on the plane indicated by the line $a$—$a$ of Fig. 1 and intersecting the tug wheel. Fig. 3 is a similar view, the section plane of which is indicated by the line $b$—$b$ of Fig. 1 and intersects the brake wheel. Fig. 4 is a detail sectional view of a portion of the tug wheel on the plane indicated by the line $c$—$c$ of Fig. 2. Fig. 5 is a similar view of a portion of the brake wheel on the plane indicated by the line $d$—$d$ of Fig. 3. Fig. 6 is a detail sectional view, showing a portion of a tug wheel embodying a modification of my invention. Fig. 7 is a detail perspective view of one of the gudgeons. Fig. 8 is a detail perspective view, showing portions of a pair of the segmental members of one of the outer rim rings constructed to form an overlapping joint at their meeting ends.

The shaft 1 of my improved bull wheel is a tube of iron or steel and of suitable length, thickness and diameter. The shaft tube is provided at its ends with V-shaped recesses 2 and is also provided near its ends with radial openings 3.

At the ends of the tubular shaft are gudgeons 4 each of which has a flange plate 5 which is circular in form and corresponds in diameter with and fits against one end of the tubular shaft 1. Each gudgeon is also formed with an inwardly extending plug portion 6, which is cylindrical in form and fits in one end of the tubular shaft, the gudgeons being further provided with V-shaped locking keys 7 which are on the peripheries of the plug portion 6 and the bases of which are formed by the flange plates 5, the said locking keys engaging the notches 2 at the ends of the said tubular shaft and hence, locking the gudgeons to the ends of the shaft so as to cause the shaft and gudgeons to rotate together and prevent the shaft from having angular movement with respect to the gudgeons. Bolt rods 8 are arranged in the bore of the tubular shaft, extend therethrough from end to end and also extend through openings in the flange plates 5 of the gudgeons and are provided at their ends with locking nuts 9 which bear on the outer sides of said flange plates. Hence, the gudgeons are firmly and yet detachably connected to the tubular shaft. I also provide locking bands 10 which are shrunk on the ends of the tubular shaft and on the peripheries of the flange plates of the gudgeons and extend across the joints formed between the said flange plates and the ends of the tubular shaft, as shown.

The tug wheel 11 is formed with a pair of separable hub members 12 which are clamped together on opposite sides of the tubular shaft 1 and are provided with inwardly extending locking studs 13 which engage the openings 3 near that end of the tubular shaft, the tug wheel being thus arranged so that it can be readily detached from the tubular shaft and yet so securely connected thereto as to be prevented from turning independently thereof. Each member of the hub of the tug wheel is provided with a series of spoke members or arms 14 some of which are in practice formed, on their outer sides, with the usual helpers, such as are indicated at 15. The hub members of the tug wheel are detachably secured together by means of bolts 16 and the spokes or arms of the tug wheel are provided at their outer ends with V-shaped notches 18 and are also provided at their outer ends, at their sides, with recesses 19 and also with medially disposed recesses 20 at their outer ends.

Outer rim rings 21 are fitted in the recesses 19 and each comprise a pair of semicircular or segmental members 22 connected at their ends by overlapping joints 23. A centrally arranged rim ring 24 which is of less exterior diameter than the rim rings 21 is fitted in the recesses 20 in the outer ends of the spokes or arms of the tug wheel and is also composed of a pair of semicircular or segmental members 25, the ends of which are connected together by overlapping joints 26. The rim rings are provided at their inner sides with inwardly extending flanges 27 on their opposing surfaces which flanges support tug cants or segments 28 which are made of wood, are adapted to be renewed when worn and are provided with grooves 29 in their outer sides which correspond with the notches 18 at the outer ends of the spokes or arms and are adapted to receive the usual tug ropes or cables. The overlapping ends of the rim rings are connected together by bolts 30 which also secure the rim rings to the spokes or arms of the tug wheel and the cant segments 28 are detachably secured in place between the rim rings and the spokes or arms by means of bolts 31 which extend transversely through the cant segments and also through the rim rings. One of the segments or members of the outer rim ring is formed with a dog 33. All the parts of the tug wheel, excepting the cants or cant segments are made of iron or steel and may be cast. Hence, the tug wheel is exceedingly strong, is adapted to be readily disassembled or assembled and may be manufactured at comparatively slight cost. It requires only a short time in which to remove any of the cant segments and replace the same by a new one, and, hence, the tug wheel may be continued in service for an indefinite period of time, the cant segments which are made of wood, and which are the only parts of the tug wheel that are susceptible to wear being thus adapted to be readily and economically renewed.

The brake wheel 35 comprises a pair of hub members 36 which are identical in construction with those of the tug wheel, are provided with inwardly extending locking studs 37 which enter the openings 3 near that end of the tubular shaft on which the brake wheel is placed, the members of the brake wheel being secured together and on opposite sides of the tubular shaft by bolts 38 and the spokes or arms 39 of the brake wheel being provided at their outer ends with side recesses 40 and centrally disposed recesses 41 which respectively receive the side and center rim rings 42—43. The rim rings of the brake wheel are substantially identical in construction with those of the tug wheel, and provided on their inner sides with inwardly extending flanges 44 which project from their opposing surfaces, the said rim rings of the brake wheel being provided with overlapping joints 45 and their members being secured together and also to the outer end of the hubs of the brake wheel by means of bolts 46. The cants 47 on the brake wheel are made of wood, are fitted between the outer ends of the spokes of the brake wheel and also between the rim rings thereof and their inner sides bear on the flanges of said rim rings, the outer sides or peripheries of the cants of the brake wheel projecting beyond the outer sides or peripheries of the rim rings and beyond the outer ends of the spokes of the brake wheel, as shown. These cants are detachably secured in place by means of bolts 48 which permit of their ready removal and renewal when they become broken and worn and, hence, the brake wheel also is adapted to be kept in use for an indefinite period of time.

In Fig. 6, I show a modified form of construction of the tug wheel in which the central rim ring of the tug wheel is dispensed with and the cants of the tug wheel, indicated at 49 form only a single peripheral groove 50 for engagement by a single tug rope or cable.

While I have herein shown and described a preferred embodiment of my invention, I would have it understood that changes may be made in the form, proportion and construction of the several parts without departing from the spirit of my invention and within the scope of the appended claims.

I claim:—

1. In a bull wheel, the combination of a tubular shaft on which the tug and brake wheels are secured, said shaft being provided with recesses in its ends, and gudgeons detachably secured on the ends of the tubular shaft, each of the gudgeons having plug members fitting in one end of the shaft and provided with locking keys engaging the notches or recesses of the shaft, the gudgeons being further provided with flange plates which bear against the ends of the tubular shaft, and bolt rods extending through the bore of the tubular shaft and also through openings in the gudgeons, the said bolt rods being provided with nuts which bear on the outer sides of the gudgeons, and bands on the ends of the tubular shaft and the flange plates of the gudgeons and extending across the joints between the ends of the shaft and the said flange plates.

2. A bull wheel including a tubular shaft open at its ends, gudgeons fitting in and detachably secured on the ends of the shaft, each gudgeon having a plug member fitting in one end of the shaft, the gudgeons and the shaft ends being also provided with coacting means to prevent independent rotation of the shaft on the gudgeons, and bolt rods arranged in the bore of the shaft and extending through and secured to the gudgeons, and nuts on the ends of the bolt rods and bearing against the outer sides of the gudgeons.

In testimony whereof I affix my signature in presence of two witnesses.

FRANCIS T. KERNS.

Witnesses:
FRED MICHAEL,
FRANK EDDY.

Copies of this patent may be obtained for five cents each, by addressing the "Commissioner of Patents, Washington, D. C."